(12) United States Patent
Wainwright et al.

(10) Patent No.: US 6,403,253 B1
(45) Date of Patent: Jun. 11, 2002

(54) AQUEOUS RECHARGEABLE BATTERY

(75) Inventors: David S. Wainwright, Vancouver; Wu Li, Edmonton; Jeffrey R. Dahn, Surrey, all of (CA)

(73) Assignee: Moli Energy (1990) Limited (CA)

( * ) Notice: Subject to any disclaimer, the term of this patent is extended or adjusted under 35 U.S.C. 154(b) by 0 days.

(21) Appl. No.: 08/408,315

(22) Filed: Mar. 22, 1995

(30) Foreign Application Priority Data

Feb. 3, 1994 (CA) .............................................. 2114902

(51) Int. Cl.[7] ................................................. H01M 4/24
(52) U.S. Cl. ........................................ 429/101; 429/206
(58) Field of Search ................................. 429/101, 206, 429/209, 218

(56) References Cited

U.S. PATENT DOCUMENTS

| | | |
|---|---|---|
| 4,302,518 A | 11/1981 | Goodenough et al. |
| 4,312,930 A | 1/1982 | Hunter |
| 4,702,977 A | 10/1987 | Hiratsuka et al. |
| 5,028,500 A | 7/1991 | Fong et al. |
| 5,130,211 A | 7/1992 | Wilkinson et al. |
| 5,312,623 A * | 5/1994 | Plichta et al. ............ 429/218 X |
| 5,472,810 A * | 12/1995 | Takeuchi et al. ............ 429/218 |

FOREIGN PATENT DOCUMENTS

JP 62-23433 6/1981

OTHER PUBLICATIONS

J.N. Reimers, et al., "Electrochemical and In Situ X–Ray Diffraction Studies of Lithium Intercalation in $Li_xCoO_x$", J. Electrochem. Soc., vol. 139, No. 8, Aug. 1992, p. 2091–97.

J.R. Dahn, et al., "Structure and electrochemistry of $Li_{1+y}NiO_2$ and a new $Li_2NiO_2$ phase with the $Ni(OH)_2$ structure", Solid State Ionics, 44, p. 87–97 (1990).

T. Ohzuku, et al., "$LiMnO_2$ as Cathode for Secondary Lithium Cell", Chemistry Express, vol. 7, No. 3, p. 193–196 (1992).

Y. Miyai, et al., "Recovery of Lithium from seawater by a manganese oxide adsorbent IV. Preparation of ion–sieve––type manganese oxide", Nippon Kaisui Gakkaishi, 41(231) 152–6 (Japan) 1987.

H. Kanoh, et al., "Equilibrium Potentials of Spinel–Type Manganese Oxide in Aqueous Solutions", J. Electrochem Soc., vol. 140, No. 11, Nov. 1993, p. 3162–3166.

\* cited by examiner

Primary Examiner—Carol Chaney
(74) Attorney, Agent, or Firm—Lerner, David, Littenberg, Krumholz & Mentlik, LLP

(57) ABSTRACT

Rechargeable batteries based on the 'rocking chair' principle and alkali or alkaline earth insertion compounds are disclosed that employ aqueous electrolytes. Batteries of the invention can have energy densities comparable to conventional aqueous batteries. Embodiments of the invention include aqueous lithium ion batteries.

16 Claims, 4 Drawing Sheets

AQUEOUS RECHARGEABLE BATTERY

CROSS REFERENCE TO RELATED APPLICATIONS

The present application is a continuation of the Jan. 27, 1995 International filing date of copending PCT Application No. PCT/CA95/00042, designating the United States. The disclosure of this PCT application is incorporated herein by reference.

FIELD OF THE INVENTION

The invention pertains to the field of batteries. Specifically, the invention deals with novel aqueous rechargeable batteries that employ insertion compounds for the electrode materials.

BACKGROUND OF THE INVENTION

The demand for rechargeable batteries with higher gravimetric and volumetric energy densities has been increasing in recent years. Potential applications for these energy sources range from consumer electronics devices to motive power for electric vehicles. To meet these demands, a variety of novel or improved electrochemical systems are being developed. Several such systems have recently been introduced on a commercial basis, and include products based on nickel-metal hydride (Ni-MH) or on lithium ion (also known as "rocking chair") systems. The former is an example of an aqueous rechargeable battery product, while the latter is an example of a non-aqueous product.

Aqueous rechargeable battery systems have been used commercially for decades. Common uses include smaller Ni-Cd products for household electronics devices and larger Pb acid products for SLI (starting-lighting-ignition) requirements for automobiles. Typically, aqueous battery products share several advantages over non-aqueous battery products. Being water based, the contents of the battery generally cannot ignite and burn. Thus, in abuse situations, aqueous batteries offer a relatively low risk of fire. (Of course, the risk of fire and/or explosion as a result of hydrogen generation in certain aqueous systems is well known). Additionally, aqueous electrolytes have ionic conductivities that are typically from 2 to 3 orders of magnitude greater than those of non-aqueous electrolytes at a given temperature. Thus, it is possible to design high rate (power) aqueous batteries with much thicker electrodes than those required for a corresponding high rate non-aqueous battery. The ability to fabricate high rate batteries, using relatively thick electrodes, translates into easier fabrication and easier prevention of defects with a corresponding reduction in cost. Finally, aqueous electrolytes are generally preferred over non-aqueous electrolytes from an environmental viewpoint.

Non-aqueous systems, on the other hand, have the advantage that they are not limited by the electrochemical stability of a water based electrolyte. Thus, such systems may operate at relatively high cell voltages (>3 volts), resulting in batteries with high energy densities. For example, battery systems employing lithium metal anodes often have theoretical energy densities of order of several hundreds of Wh/kg or Wh/l. In practice however, the safety characteristics of lithium batteries have limited both the practical energy densities obtained as well as the maximum battery size in commercial products to date.

Recently, lithium batteries based on lithium ion or "rocking chair" electrochemistries have entered the marketplace. These electrochemistries employ two suitable lithium insertion compounds as the active electrode materials and a non-aqueous electrolyte. Typically a carbonaceous material (partially graphitized) is employed as the anode, and a lithium transition metal oxide is employed as the cathode. During a discharge of the battery, lithium is removed from the host anode insertion compound and is inserted into the host cathode insertion compound. On recharge, the reverse process occurs. No plating process of a transported ionic species is fundamentally involved. The battery voltage is determined by the difference in the chemical potential of lithium in the two host electrodes, which is on average about 3½ electron volts. Lithium ion batteries thus offer high voltage with corresponding high energy densities, and these systems can cycle extremely well (over 1000 cycles).

Commercial lithium ion batteries can deliver energies of order of 200 Wh/l and 100 Wh/kg. This is achieved, in part, by using a minimal amount of non-aqueous electrolyte in the battery. Unlike some electrochemistries (eg. Pb acid, Ni—Cd), the Li ion electrolyte does not participate in the reactions on charge or discharge and merely serves as a conduit for Li ions between the electrodes. The low ionic conductivity of the Li ion electrolyte however requires that thin electrodes (of order of 100 $\mu$m thick) be used in the battery construction. With the use of very thin electrode substrates (eg. Al or Cu foil) and thin separators however, a relatively high loading of active electrode material can still be obtained in the fabricated battery. Approximately 45% of the overall weight of small cylindrical cells (eg. 4/3 A size) can be active electrode material.

The safety of lithium ion batteries is significantly better than that of similarly sized lithium metal batteries. There is still however a risk of fire or explosion under some types of mechanical or thermal abuse. This poses a problem for the commercialization of larger batteries or battery arrays. Also, those skilled in the art are aware that the risk of fire during abuse situations places limits on the deliverable capacity of such batteries. For instance, the amount of lithium that can be removed reversibly from commercial $LiCoO_2$ based cathodes is significantly greater than that actually used in practice for reasons of safety.

There are other disadvantages associated with conventional non-aqueous lithium ion type electrochemistries. The thin electrode requirement means that costly separator and foil current collectors must be used. The thin electrode assembly is correspondingly more complex. The active materials used in the electrodes must obviously be significantly smaller than the electrode itself. Thus, fine electrode powders (with a corresponding higher reactive surface area) may need to be used even though large particles may be sufficient for a given discharge rate.

Although the fine electrode powders are generally stable in air, a significant amount of water can be adsorbed onto the large surface area presented by such powders. Additionally, the electrolytes used in lithium ion electrochemistries are also generally hygroscopic. Since it is detrimental to include water in an assembled battery, many fabrication steps involve water removal or shielding from moisture in the air (typically in dry room environments).

Another less well known problem arises from the instability of many common materials to oxidation at the high operating potentials at the typical lithium ion cathode. Fortunately, aluminum is an inexpensive material that is acceptable for use as hardware at the cathode potential for most but not all lithium ion electrochemistries. However, a significant problem can arise due to the presence of certain impurities in the cathode materials themselves. The presence of even one small particle of an oxidizable metal contaminant (such as copper, stainless steel, iron) in the cathode can result in the development of an internal short in the battery. At the high operating voltages of such batteries, these contaminants can dissolve and plate over to the anode, creating an electrically conducting contaminant bridge between the electrodes. The thin separators (approx. 25 $\mu$m) employed in such batteries are not completely effective in preventing such internal shorts. Even with stringent quality control and cleanliness procedures, it is not uncommon in the applicant's experience to obtain from 5 to 10% internal shorts in developmental 4/3 A batteries. Those skilled in the art who are aware of this problem will appreciate the difficulties that this will pose in fabricating large defect free batteries.

The choice of appropriate insertion compounds is fundamental to the construction of a lithium ion battery. Currently, lithiated transition metal oxides including $LiCoO_2$, $LiNiO_2$, $LiMn_2O_4$ (described in U.S. Pat. Nos. 4,302,518 and 4,312,930) and the like are among those favoured as cathode materials, while partially graphitized carbon or graphite (described in U.S. Pat. Nos. 4,702,977 or 5,028,500 and Japanese Patent Publication No. 57-208079) are favoured as anode materials. Such materials are popular for reasons of voltage and their reversible capacity. Over recent years however, a range of Li insertion compounds has been considered for use as either electrode in non-aqueous batteries including transition metal chalcogenides (eg. $MoS_2$, $TiS_2$), chevrel compounds ($Mo_6S_8$), other transition metal oxides ($V_2O_5$, $MnO_2$), $WO_2$, and so forth. Many of these compounds can have significant amounts of lithium inserted and extracted reversibly. $LiNiO_2$ and $LiCoO_2$ both can cycle over 140 mAh/g of lithium reversibly (Ohzuku et al, Chemistry Express, 7, 193 (1992)). A form of $LiMnO_2$ synthesized at low temperature can reversibly cycle up to 190 mAh/g of lithium. (J. R. Dahn, U. von Sacken, and C. A. Michael, Solid State Ionics 44, 87 (1990) and J. N. Reimers and J. R. Dahn, J. Electrochem. Soc. 139, 2091 (1992) respectively) Li-graphite or $LiC_6$ can cycle up to 360 mAh/g of lithium reversibly under some conditions. (as in U.S. Pat. No. 5,130,211 for example)

Non-aqueous "rocking chair" type batteries employing an insertion species other than lithium have been considered by those skilled in the art. Insertion compounds are known to exist for many inserted species belonging to the group of alkali metals and alkaline earth metals in general. (The group of alkali metals includes the group Ia elements Li, Na, K, Rb, Cs and Fr while the group of alkaline earth metals includes the Group IIa elements Ca, Sr, Ba and Ra). However, competitive non-aqueous "rocking chair" type rechargeable battery systems have not been developed to date using inserted species other than lithium. (In addition to being larger atoms than lithium and hence more difficult to diffuse, certain other members of the group of alkali metals are even more of a fire hazard than is lithium. This would not be a direct issue in an aqueous battery.)

Although not traditionally viewed in this sense, the nickel electrode of a Ni-Cd battery is essentially a hydrogen insertion compound. With similar thinking, a Ni-MH battery is essentially a "rocking chair" battery using two hydrogen insertion compound electrodes. In this sense, practical competitive aqueous "rocking chair" type rechargeable batteries exist wherein the inserted species is hydrogen.

Alkali metal and alkaline earth metal insertion compounds have been considered for use in other aqueous applications, such as ion exchange media or sensor electrodes (such as in Japanese Patent Application Laid Open No. 52023692 or Y. Miyai et al., Nippon Kaisui Gakkaishi, 41(231) 152–6 (1987) respectively). However, aqueous "rocking chair" batteries using these compounds have not been considered in the art. This might be presumed to be a result of the known instability of many common lithium insertion compounds in water.

SUMMARY OF THE INVENTION

The inventors have invented useful aqueous "rocking chair" type rechargeable batteries using insertion compound electrodes and inserted species that are conventionally considered only for use in non-aqueous batteries. Based on the meaning intended by the term "rocking chair", the batteries of the invention employ a cathode comprising a first insertion compound with inserted species A, and an anode comprising a second insertion compound also with inserted species A. On recharge of the battery, species A is extracted from the first insertion compound while concurrently species A is inserted into the second insertion compound. (The battery of the invention employs an electrolyte comprising a salt of A dissolved in an aqueous solvent mixture, thus providing an ionic pathway between anode and cathode for species A. For the batteries of the invention, A is a member of the group of the alkali metals and alkaline earth metals.

A basic electrolyte can be employed wherein the pH is greater than 7. This may allow insertion compounds to be used in the battery of the invention that would not normally be stable in pure water.

The inserted species A for the battery of the invention may be lithium, and either or both of the first and second insertion compounds may be a lithium transition metal oxide. The first and second insertion compounds may even be of the same host structure, but have differing amounts of inserted species A.

Lithium manganese oxides or lithium vanadium oxides may be employed as either the first or second insertion compound. The spinel $Li_xMn_2O_4$, wherein x is a number which can range from 0 to about 2, can be used as either the active cathode or the anode material or both. $Li_yMnO_2$ with a $\gamma$-$MnO_2$ structure, wherein y is a number which can range from 0 to about 1, can be used as an anode material. $Li_zVO_2(B)$, wherein z is a number which can range from zero to about 0.5, can also be used as an anode material.

The salts employed in the electrolyte of a battery using lithium as the inserted species may be LiOH, LiCl, $LiNO_3$, $Li_2SO_4$, or Li(acetate).

An electrolyte comprising more than one salt may be employed. In order to simultaneously obtain a basic electrolyte having a certain concentration of ionized species A but, additionally, a lower concentration of hydroxide ions, a hydroxide salt may be used in addition to a salt of A. In a battery using lithium as the inserted species, the salt can be LiCl, $LiNO_3$, $Li_2SO_4$, or Li(acetate) and the additional hydroxide salt can be LiOH wherein the concentration of the former is greater than that of the latter.

Other aspects of the invention include a method for making a rechargeable battery comprising: selecting a first insertion compound capable of insertion with species A wherein A is a member of the group consisting of the alkali metals and alkaline earth metals; selecting a second insertion compound capable of insertion with species A; selecting an electrolyte comprising a salt of A dissolved in an aqueous solvent mixture in a concentration such that both first and second insertion compounds are kinetically stable therein over some respective ranges of inserted A; and constructing a battery comprising a cathode, the cathode comprising the first insertion compound, an anode, the anode comprising the second insertion compound, a total amount of inserted species A, separation means for electrically separating the cathode from the anode, cathode current collector means in electrical contact with the cathode, anode current collector means in electrical contact with the anode, and a container.

A portion of the inserted species A in the range from zero to the total required amount can be inserted into the first insertion compound prior to constructing the battery. Additionally, a portion of the inserted species A in the range from zero to the total required amount can be inserted into the second insertion compound prior to constructing the battery. Alternately, a portion of the inserted species A in the range from zero to the total required amount can be inserted into either the first or the second insertion compounds by electrochemical means, the portion originating from the salt of A.

An electrolyte can be selected that further comprises an additional hydroxide salt, the concentration of said additional hydroxide salt being less than the concentration of the salt of A.

Finally, the first and the second selected insertion compounds selected can be the same.

BRIEF DESCRIPTION OF THE DRAWINGS

Figures are provided that illustrate certain non-optimized aspects of the invention, but should not be construed as limiting in any way.

DETAILED DESCRIPTION OF EMBODIMENTS OF THE INVENTION

Figure 1:
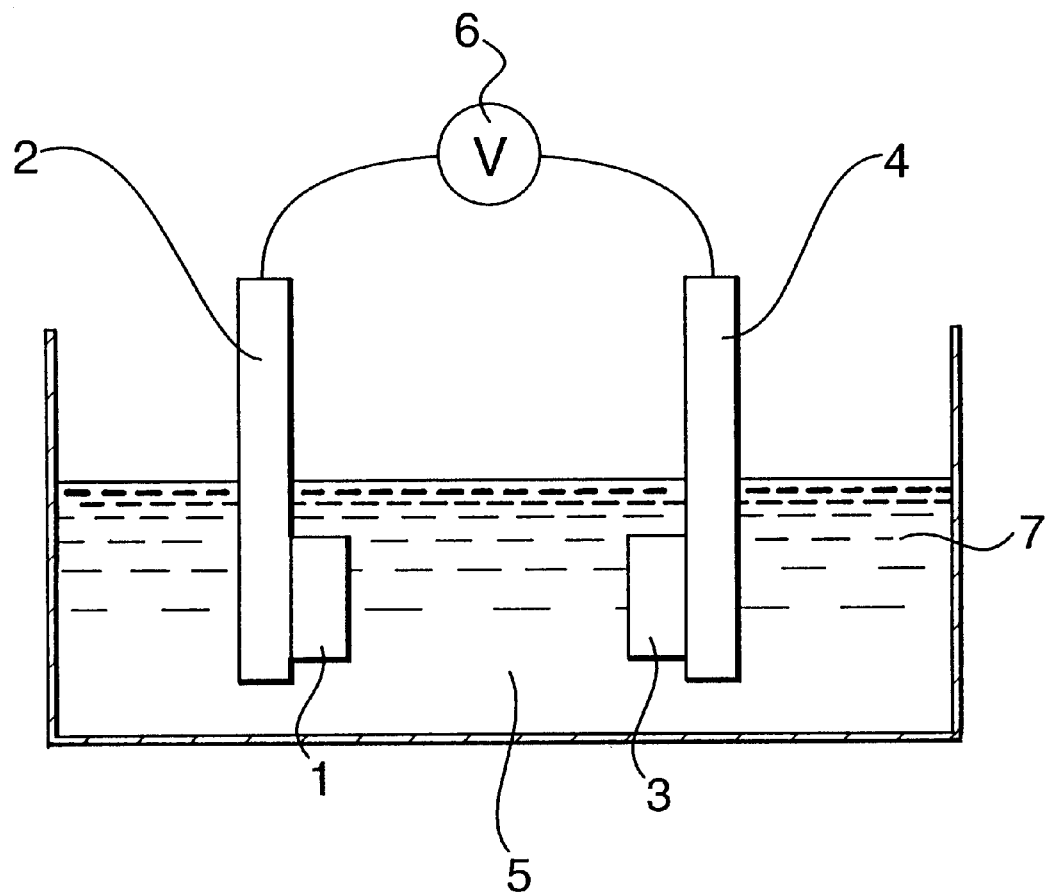
FIG. 1 shows a schematic drawing of the battery of the invention.

The fundamental construction of the battery of the invention is shown in the schematic of FIG. 1. Therein, a cathode 1 comprises a first insertion compound in electrical contact with a cathode current collector 2. (Herein, "insertion compounds" are broadly defined as host materials into which a species can be inserted and extracted without adverse irreversible effect on the crystal structure of the host). An anode 3 comprises a second insertion compound in electrical contact with an anode current collector 4. In physical contact with both electrodes, cathode 1 and anode 3, is an aqueous electrolyte 5 comprising a dissolved salt of the inserted species A of the battery. The inserted species A can be an alkali or alkaline earth metal. During operation of the battery, ions of A migrate to and from each electrode 1,3 through aqueous electrolyte 5. Concurrently, electrons migrate to and from each electrode 1,3 via external circuit 6. The battery contents are housed in a container 7. A variety of actual constructions, sizes, configurations, etc. may be employed that show similarities to both commercial aqueous and non-aqueous batteries. Preferred embodiments will combine the advantages of both where possible depending on the application.

The choice of insertion compounds and the electrolyte to be employed is of fundamental importance. It is generally preferred to obtain the largest operating voltage without decomposing the aqueous electrolyte into $H_2$ and $O_2$ by electrolysis. Consideration must then be given to the absolute potential of both the first and second insertion compounds as a function of the amount of species A inserted. Oxygen can be generated at the cathode 1 via the reaction

$$2OH^-_{(aq)} \rightarrow H_2O + \tfrac{1}{2}O_{2(g)} + 2e^-$$

at +0.401V versus the standard hydrogen electrode (S.H.E.) for species in the standard state. Similarly, hydrogen can be generated in principle at the anode 3 via the reaction

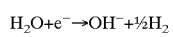
$$H_2O + e^- \rightarrow OH^- + \tfrac{1}{2}H_2$$

at −0.83V versus S.H.E for species in the standard state. However, as with conventional aqueous batteries, practical batteries may be constructed that operate beyond these limits (ie. Pb acid batteries with 2V operating potential).

The presence of the dissolved salts in the electrolyte can modify the potential at which this decomposition occurs. Thus, the difference between the potentials of the first and second insertion compounds is ideally as great as possible without causing electrolysis of the electrolyte or other unwanted reactions. Additionally, the voltage profile of preferred insertion compounds as a function of the amount of species A inserted is relatively flat or constant. In this way, large amounts of species A might be inserted or removed without reducing the operating voltage of the battery and also without exceeding decomposition limits for the electrolyte.

A suitably chosen electrolyte may itself have a wide voltage stability range and may also widen the voltage range for kinetic stability of the possible electrode materials. Co-pending Canadian Patent Application Serial No. (unassigned), filed on Jan. 28, 1994, "AQUEOUS ELECTROCHEMICAL PREPARATION OF INSERTION COMPOUNDS AND USE IN NON-AQUEOUS RECHARGEABLE BATTERIES", invented by Wu LI and Jeffrey Raymond Dahn discloses basic aqueous solutions and principles for selection that provide stability for certain insertion compounds that are not stable in pure water (or in acidic environments). Thus, while embodiments of the invention may include those having neutral or somewhat acidic electrolytes, it may be advantageous to employ a basic electrolyte wherein the pH is greater than 7.

Generally, the diffusion coefficients of the inserted species A in preferred insertion compounds are small enough such that these compounds must be used in powdered form in practical applications. This is generally desired anyway in the synthesis of many of these materials. Since aqueous electrolytes have higher ionic conductivities than non-aqueous electrolytes, it will be expected that insertion compound powders may be employed, where desired, wherein the particle size of the powders is somewhat larger than the particle size currently used in conventional lithium ion batteries. Also, preferred insertion compounds may not have satisfactory electronic conductivity. Hence, actual electrodes might be expected to be fabricated using suitable conductive dilutants and binders (as in lithium ion batteries) or using sintered plates (as in NiCd batteries). It is expected that the electrode thicknesses may be similar to those for standard aqueous batteries for a given rate requirement.

Although a simple physical separation (separation means) between cathode 1 and anode 3 is adequate, usually a separator material (not shown in FIG. 1) is employed to allow the maximum loading of active contents in the battery. Thin microporous separators may be employed but are not required. If conventional aqueous battery electrode thicknesses are employed, then it may be advantageous to use conventional aqueous battery separators which can include woven or matted polymer fiber sheet materials.

To a great extent, the principles behind electrolyte selection for a battery according to the invention are similar to those for conventional aqueous electrochemical systems. Preferred insertion compounds for use as electrodes may however require a certain minimum basic pH for stability. Additionally, electrolytes preferably have high ionic conductivity and have sufficient salt concentrations to prevent electrolyte depletion during operation of the battery. In certain circumstances, it may be desirable to use more than one dissolved salt in the electrolyte in order to meet conditions that may be mutually exclusive when using a single salt. An illustration of this possibility is described in Example 2 (below) wherein a relatively small concentration of LiOH is employed (the intention being to maintain stability of both a lithiated and a delithiated manganese oxide electrode) in combination with a relatively large concentration of LiCl (the intention being to provide better ionic conductivity).

The system described above is an example of a salt combination wherein the cations of the two salts are the same but the anions are different. It may be of advantage for other reasons to employ a salt combination wherein two or more salts have common anions but different cations. However, such a combination would have to be compatible with the insertion characteristics of the electrode materials.

Solvent mixtures may also be preferred over water alone for certain reasons. As with water, many alcohols and other solvents are not suitable for use in conventional non-aqueous lithium batteries since these solvents can react with the electrode material. However, such solvents might be suitable in certain embodiments of the invention. In commercial Li ion batteries, it is conventional to load the total amount of the inserted species A into the first insertion compound prior to constructing the battery. For batteries of the invention however, it may be advantageous to load a portion of the total amount of the inserted species A into either first or second insertion compounds or both. In other circumstances, it may be desirable to add an excess of a salt of A in order to electrochemically insert additional species A into an electrode and hence into the battery prior to completing the battery assembly. (The electrochemical method for accomplishing this is the subject of the invention of the aforementioned Canadian Patent Application Serial No. (unassigned), filed on Jan. 28, 1994, "AQUEOUS ELECTROCHEMICAL PREPARATION OF INSERTION COMPOUNDS AND USE IN NON-AQUEOUS RECHARGEABLE BATTERIES", which was invented by Wu LI and Jeffrey Raymond Dahn.

Hardware requirements for the batteries of the invention can also be expected to share similarities to other aqueous systems. This hardware includes the current collectors and container. Consideration with regards to possible chemical and/or electrochemical corrosion must be made in the choice of this hardware, particularly if strongly basic electrolytes are employed.

With the preceding in mind, possible embodiments for the invention batteries can otherwise be expected to have characteristics adopted from both aqueous and non-aqueous commercial batteries. For example, constructions having spirally wound electrodes, stacked electrode plates, bobbin formats, or the like, can be envisaged. As with some Pb acid batteries, it may be desirable to adopt a design that allows for replenishment of the electrolyte over time.

Examples are shown below for several batteries of the invention in laboratory embodiments. These batteries are not optimized for performance characteristics and merely serve as illustrations for those skilled in the art. Thus, the examples should not be considered as limiting in any way. The inventors believe that it is not unreasonable that suitable electrochemistries may be employed which result in batteries with commercially competitive performance. As an example, if cathode and anode insertion compounds were successfully employed having an average voltage difference of 1.5 V and 150 mAh/g of reversible species capacity each in operation, the theoretical gravimetric energy density based on the two electrodes alone would be 1.5×150/2, equalling about 112 Wh/kg. Since it is already possible to achieve electrode loadings equal to 45% of the total weight in commercial Li-ion batteries, practical batteries based on the preceding assumptions might be expected to operate at about 50 Wh/kg. Additionally, higher aqueous battery operating voltages and reversible capacities for insertion compounds have been achieved in the art. Thus, while the maximum theoretical energy density for the battery of the invention is significantly less than that of its non-aqueous counterparts, it may still be possible to achieve of order of 100 Wh/kg in a practical embodiment.

EXAMPLE 1

$Li_{0.36}MnO_2$ with the $\gamma$-$MnO_2$ structure was prepared by reacting $LiOH \cdot H_2O$ with electrolytic manganese dioxide (TAD #1 grade of Mitsui). The materials were thoroughly mixed as described in U.S. Pat. No. 4,959,282 and were then heated at 350° C. for several hours in air. The spinel $LiMn_2O_4$ was synthesized from $Li_2CO_3$ and Chemical Manganese Dioxide (CMD). Stoichiometric ratios of the reactants were mixed and heated at 750° C. in air for 24 hours. The lattice constant of this material was 8.246 Å, in good agreement with the literature value (M. M. Thackeray et al, J. Electrochem. Soc. 137, 769 (1990)).

Electrodes were prepared by sandwiching an amount of each aforementioned material between two titanium bars thus creating Ti-$LiO_{0.36}MnO_2$—Ti and Ti—$LiMn_2O_4$—Ti anode and cathode sandwiches respectively. The titanium bars were 3 mm thick, 25 mm wide, and about 150 mm long and served as both mount and current collector. Only about 50 mm of one end of each bar was actually coated with active insertion compound-powder. Each bar was drilled in this region with about twenty uniformly spaced 2 mm diameter holes. Electrode pastes of each Li—Mn—O material comprising Li—Mn—O powder, Super S (trademark of Ensagri) carbon black, and polyvinylidene fluoride in a weight ratio of 87:10:3 were made by mixing the components in N-methyl-pyrollidinone (NMP) solvent. Each paste was spread onto two titanium bars and was pushed into the holes to ensure good bonding. The bars were then clamped together so that the paste coatings touched, to make a Ti-(Li—Mn—O)-Ti sandwich. The paste was dried by placing the assembly in a drying oven at 105° C. in air to evaporate the NMP. Electrodes contained about 2.0 grams of Li—Mn—O powder over an area of 5 cm×2.5 cm. The thickness of the Li—Mn—O layer between the two Ti bars was about 2 mm.

An aqueous electrochemical cell was made in a Pyrex (trade-mark) beaker with electrodes inserted from the top as illustrated schematically in FIG. 1. The paste coated ends of the two electrodes were immersed to a depth of about 70 mm in the electrolyte in the beaker and the beaker was covered with a Lucite (trade-mark) lid. The electrode spacing was 25 mm. A Ag/AgCl reference electrode was inserted midway between the two working electrodes. The electrolyte was 1M LiOH in water and the cell was operated at 20° C. The working electrodes were connected to a current supply. The voltage between the two working electrodes was monitored as was the voltage between the reference electrode and the $LiMn_2O_4$ cathode. Initially, a current was passed in the external circuit to extract electrons from the $Li_{0.36}MnO_2$ cathode and deliver them to the $LiMn_2O_4$ anode (the charge direction). This causes Li to be extracted from $Li_{0.36}MnO_2$ to form $Li_{0.36-m}MnO_2$ and the insertion of Li into $LiMn_2O_4$ to form $Li_{1+n}Mn_2O_4$. (m and n are positive numbers and are related by the mole ratio of the cathode to anode.) The former reaction occurs at a voltage versus lithium of about 3.5 volts depending somewhat on the value of m while the latter reaction occurs at a voltage of about 2.97 volts almost independent of n. Therefore, the voltage of this cell is expected to be in the range of 0.5 volts. The anode in this Example operates very near the potential for oxygen evolution in 1M LiOH, so some concomitant $O_2$ generation may occur as this cell is operated.

Figure 2A:
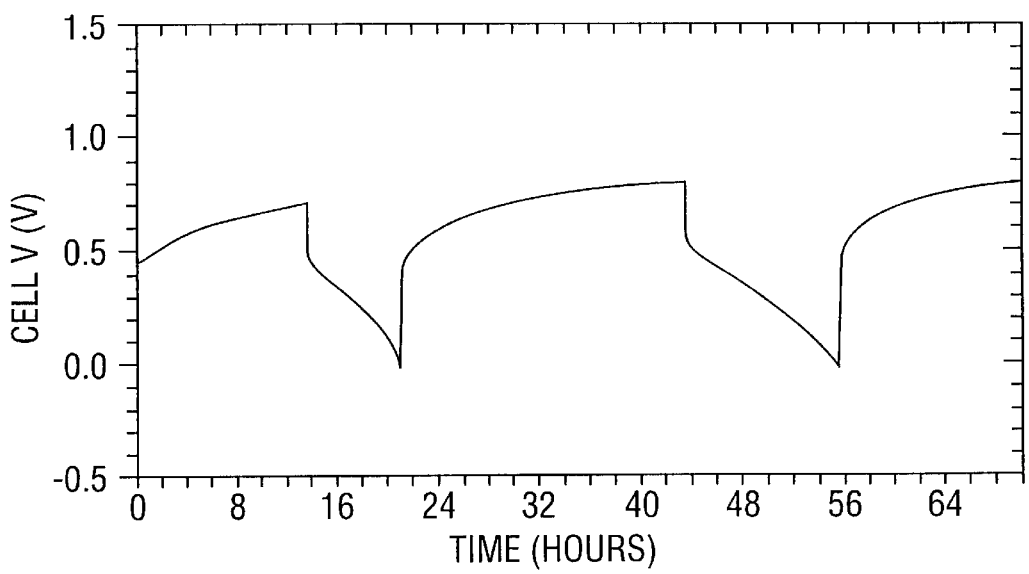
FIG. 2a shows the voltage versus time plot for the battery of Example 1.
Figure 2B:
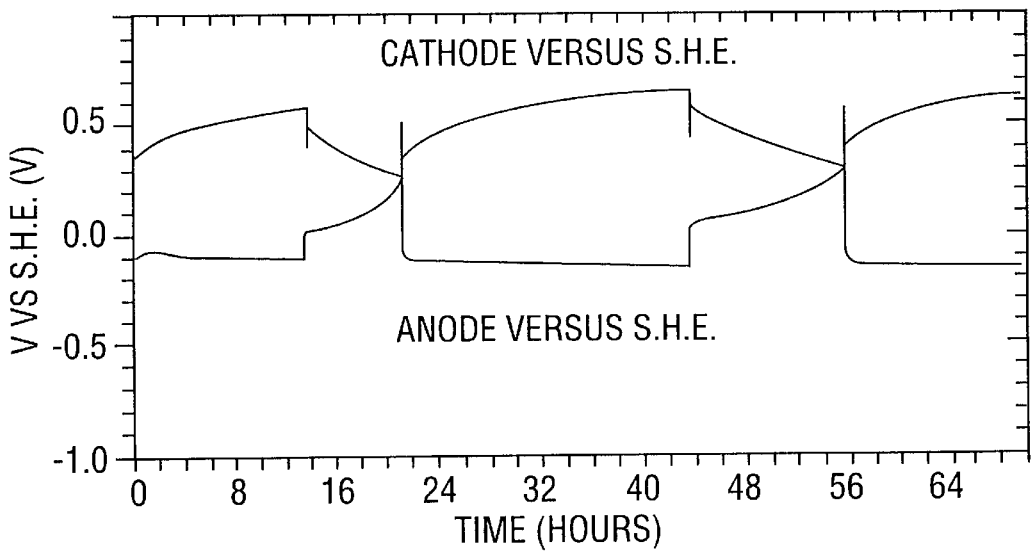
FIG. 2b shows the voltage versus time plot for each electrode of the battery of Example 1 versus the standard hydrogen electrode.

FIG. 2a shows the voltage versus time for the cell of this example as it is first charged to about 0.7 volts, discharged to 0.0 volts, charged to 0.8 volts and then discharged to 0.0 volts again. The currents used were 2 mA. At this current it would take 150 hours to change m in $Li_{1+m}MnO_2$ by $\Delta m=0.1$. FIG. 2b shows the voltages of each working electrode versus S.H.E. (calculation based on the Ag/AgCl reference data). The anode is seen to reach potentials where oxygen generation might be expected. This could account for the fact that the charge capacity is greater than the corresponding capacity observed during discharge. A change to the electrolyte might eliminate this problem and is illustrated in Example 2.

EXAMPLE 2

Figure 3A:
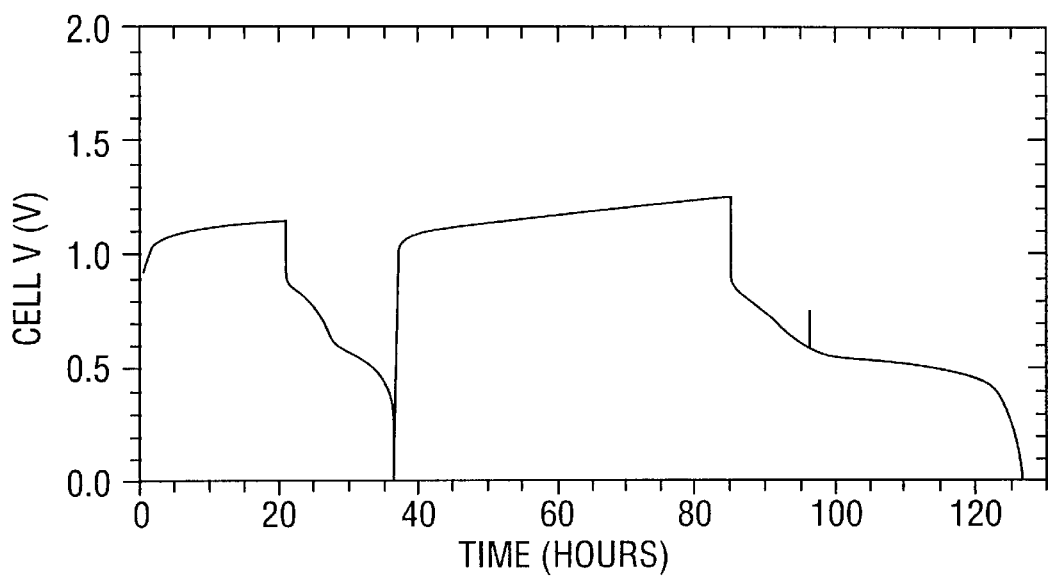
FIG. 3a shows the voltage versus time plot for the battery of Example 2.
Figure 3B:
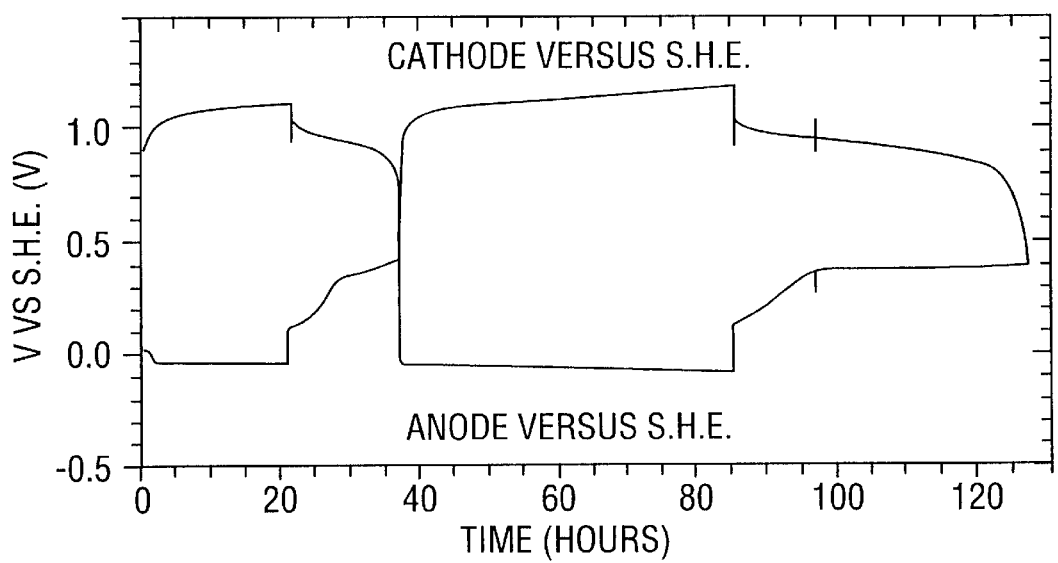
FIG. 3b shows the voltage versus time plot for each electrode of the battery of Example 2 versus the standard hydrogen electrode.

Two 2 gram sandwich electrodes, both made of $LiMn_2O_4$, were prepared as in Example 1. These were assembled into a cell with a reference electrode as before, except that here the electrolyte was 5M LiCl in $H_2O$, whose pH was adjusted with LiOH to be pH 11. The cell was operated with charge and discharge currents of 2mA at a temperature of 20° C. FIG. 3a shows the voltage between the working electrode terminals as the cell of this example is first charged to 1.15 volts, discharged to 0.0 V, charged to 1.25 volts and discharged again to 0.0V. For these cycles, the coulometric efficiency and the cell terminal voltage is much improved over the cell of Example 1. The second discharge cycle lasts about 40 hours and therefore corresponds to a change of $\Delta n$ 0.3 in each $Li_{1\pm n}Mn_2O_4$ electrode. This is roughly 45 mAh/g of specific capacity (based on a sum of both electrode weights). It should be noted that this particular cell was not tested further to determine its ultimate capacity because the cell hardware was required for other testing. FIG. 3b shows the voltage of each electrode versus S.H.E.

The following discussion is presented by the inventors to illustrate the possible theory behind the invention and reasoning behind the electrolyte choice for this Example. However, the discussion is not intended to be binding in any way. As shown in the aforementioned Canadian Patent Application Serial No. (unassigned), filed on Jan. 28, 1994, "AQUEOUS ELECTROCHEMICAL PREPARATION OF INSERTION COMPOUNDS AND USE IN NON-AQUEOUS RECHARGEABLE BATTERIES", which was invented by Wu LI and Jeffrey Raymond Dahn, $Li_{1\pm n}Mn_2O_4$ can be stable in basic LiOH solutions, even though it is not stable in pure water. Additionally, it has been recently shown (H. Kanoh et al, J. Electrochem. Soc. 140, 3162 (1993)) that $Li_{1-n}Mn_2O_4$ with n approximately equal to one will spontaneously react with concentrated LiOH solutions, producing $LiMn_2O_4$, oxygen, and water. Therefore, it is unlikely that a $Li_{1-n}Mn_2O_4$ electrode can be optimally charged (ie. removing maximum Li) in a concentrated LiOH solution.

Figure 4:
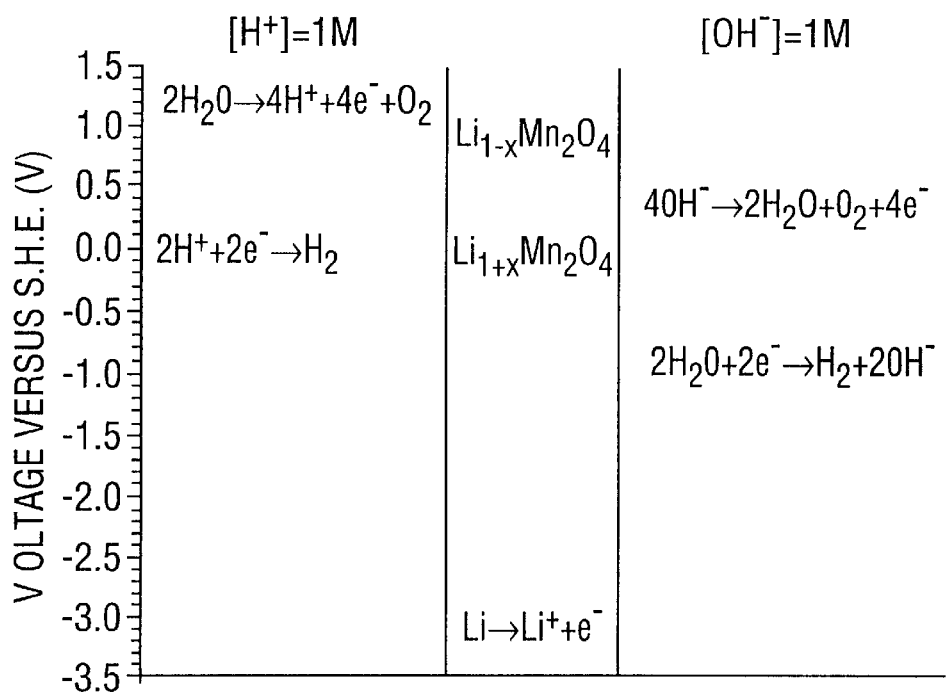
FIG. 4 depicts the absolute voltage of several half cell reactions relevant to Example 2 versus the standard hydrogen electrode.

FIG. 4 shows the potentials of the reactions of interest versus S.H.E. in aqueous solutions containing $[Li^+]=1M$. On the left hand side of FIG. 4 are shown the reactions and potentials for oxygen evolution (at the $Li_{1-n}Mn_2O_4$ cathode) and for hydrogen evolution (at the $Li_{1+n}Mn_2O_4$ anode) provided that there is a concentration $[H^+]=1M$ in addition to the $Li^+$ concentration already specified. On the right hand side of FIG. 4 are shown the corresponding reactions and potentials if $[OH^-]=1M$. It is clear that at least one of the $Li_{1\pm n}Mn_2O_4$ materials falls outside the stability range of water in both the acidic and basic case under the preceding assumptions. To deal with this difficulty, a solvent near pH=10 but with substantial $Li^+$ ion concentration can be considered for the following reasons:

Substantial $Li^+$ ion concentration is desirable to maintain good ionic conductivity and to ensure sufficient $Li^+$ is always available for reaction at each electrode as needed.

Increasing the $Li^+$ salt concentration to high molarity also may help to bind the water to the dissociated salt ions (thereby preventing reaction with inserted lithium to some extent) and to prevent the water from decomposing into $H_2$ and $O_2$. (This may also be important in a lead-acid battery).

Some concentration of OH near pH=10 may be needed to stabilize $Li_{1\pm n}Mn_2O_4$ in aqueous solution.

The concentration of OH- should be as low as possible (but still meeting the preceding condition) so as to limit the spontaneous reaction of $Li_{1-n}Mn_2O_4$ with $Li^+$ and $OH^-$ to make $LiMn_2O_4$, oxygen, and water as described by Kanoh et al. in their aforementioned reference.

A suitable electrolyte for such a cell might thus be 5M LiCl adjusted to about pH=10 by addition of a small amount of LiOH. The reaction $2Cl^-=Cl_2+2e^-$ which could occur at the cathode does not, because the standard potential for this reaction is well above that of $Li_{1-n}Mn_2O_4$. Other lithium salts may be similarly suitable.

EXAMPLE 3

A matrix of laboratory size batteries was prepared employing several different anodes and electrolytes in two different types of container.

For all electrodes in this matrix test, a slurry of active electrode powder, Super S (trademark of Ensagri) carbon black, and ethylene propylene diene monomer (EPDM) binder was prepared in a weight ratio of 87:10:3 in cyclohexane solvent. The mass of active electrode powder in each slurry was about 5 grams. Each slurry was thoroughly blended for about 10 minutes and was then spread in a puddle on a glass plate. The puddle was continually agitated and stirred with a spoon while the cyclohexane evaporated. This stirring was intended to ensure uniform distribution of the binder. After the cyclohexane evaporated, large 'rubbery' agglomerates (about 5 mm in size) of active electrode powder, carbon black, and EPDM binder remained. The agglomerates were then broken up somewhat by forcing them through the holes in a #50 size mesh sieve. The sieving operation resulted in free flowing powder agglomerates (about 300 micrometers in size) suitable for tabletting.

Each tabletting powder was used to prepare electrode tablets. 0.1 grams of tabletting powder was loaded into a 0.8 mm diameter tablet press and pressed using a 4000 Newton force. Robust tablets about 1 mm thick and with about 50% porosity were formed. Tablets of this type were used in all tests of the Example 3 matrix. Anode and cathode tablets each contained about 87 mg of active electrode powder.

The first type of container used in the matrix comprised two titanium contact plates which could be screwed together with ¼" #20 nylon screws. In this battery construction, an anode tablet, a Celgard® 3500 separator (a wettable microporous polypropylene film incorporating a wetting agent), and a cathode tablet were stacked and then squeezed together by the two titanium contact plates. The tablets and separator were next thoroughly wetted with the appropriate aqueous electrolyte. Finally, this assembly was placed in a polyethylene bag to seal the contents during testing. Hereinafter, this type of construction will be referred to as Ti type.

The second type of container used was 1225 size commercial coin cell hardware (12 mm in diameter and 2.5 mm thick). The coin cell cap (at anode potential) was made of 304 stainless steel. The coin cell case (at cathode potential) was made of Shomac 30-2 (trademark). The sealing gasket was made of polypropylene. Battery construction consisted of wetting the appropriate tablets and a Celgard® 3500 separator with aqueous electrolyte, stacking them appropriately into the coin cell, and crimping the coin cell container shut afterwards. Hereinafter, this type of construction will be referred to as 1225 type.

In all matrix tests, the active powder used for the cathode tablets was $LiMn_2O_4$ prepared as described in Example 1. However, three different active powders were used for the anode tablets. These were $LiMn_2O_4$, $Li_{0.36}MnO_2$ with the γ-$MnO_2$ structure, and $VO_2(B)$. The first two of these powders were prepared as in Example 1. The $VO_2(B)$ was made according to the methods outlined in U.S. Pat. No. 4,965,150. In this Example, 50.0 grams of ammonium vanadate was reduced under flowing ammonia at 350° C. for 18 hours followed by drying under argon at 350° C. for a further 12 hours. The mass loss observed suggested that the final product stoichiometry was $VO_{1.97}(B)$.

Various aqueous electrolytes were employed wherein the salts were selected from the group consisting of LiOH, LiCl, $LiNO_3$, $Li_2SO_4$, or Li(acetate).

Batteries were all cycle tested at 20° C. using currents of 1 mA for both charge and discharge. All batteries were cycled between a fixed lower voltage limit of 0.2 V and different upper voltage limits. Occasionally, the upper voltage limit was raised following the first cycle. A tabulated summary of the battery construction, upper voltage limits used, and capacities observed on cycling are shown in Table 1. In many instances, a significant capacity is observed on the first charge and is roughly maintained after 2 complete charge-discharge cycles. However, in one instance (battery no. 6), lower capacity results were seen with 1225 type construction than with Ti type construction. Also, in some instances (battery nos. 6 or 10), a significant capacity loss occurred between the first and second discharges. The reasons for this are not yet completely understood.

Figure 5:
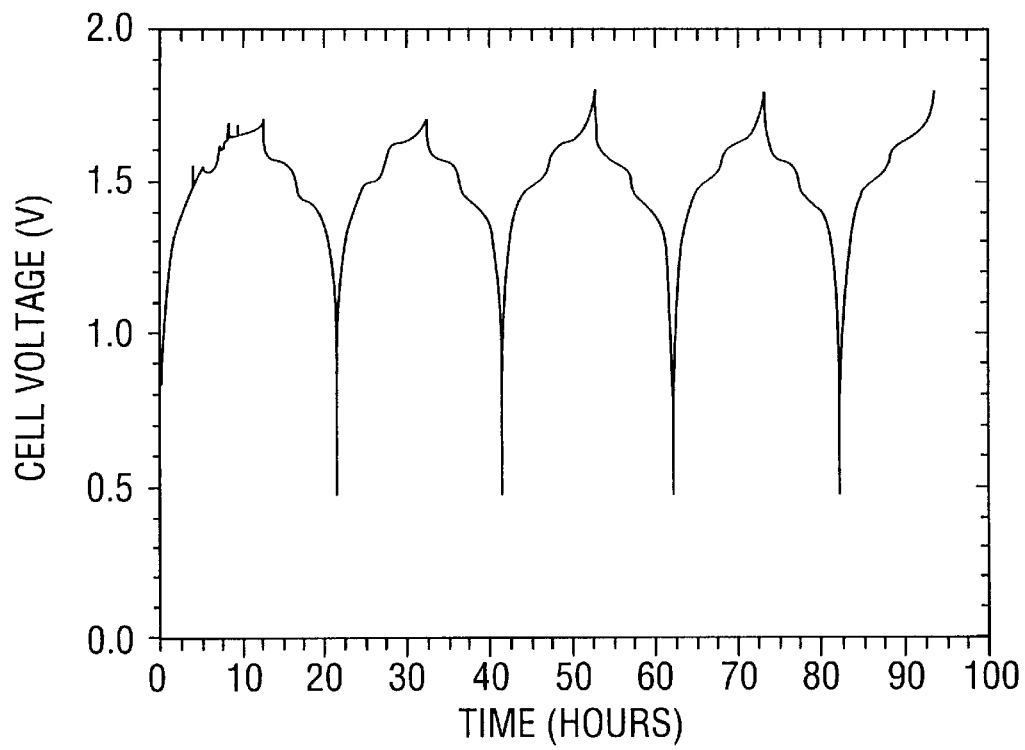
FIG. 5 depicts the voltage versus time plot for the first five cycles of battery no. 9 in Example 3.

Battery nos. 8 and 9 with $VO_2(B)$ anodes were expected to give operating voltages near 1.5 V since the capacity of $VO_2(B)$ anode is attained mainly at 2.5 V versus Li and the capacity of the $LiMn_2O_4$ cathode is attained mainly at 4.0 V versus Li. FIG. 5 shows the voltage versus time data for the first five cycles of battery no. 9. The cycling is highly reversible and the average voltage was indeed near 1.5 V. (Note that there was some erratic behaviour seen in the battery voltage during the first charge that did not appear subsequently. The cause for this has not yet been confirmed.) The battery capacity is about 10 mAh and the tablet weights together total about 200 mg (not including the electrolyte). This gives a gravimetric energy density of 75 Whr/kg based on the two electrodes alone.

This Example demonstrates that batteries of the invention can operate at average voltages around 1.5 V and can have energy densities competitive with conventional aqueous batteries.

TABLE 1

Summary of matrix tests of Example 3.

| Battery No. | Construction | Anode | Electrolyte | Initial Upper Cutoff (V) | 1st charge capacity (mAh) | 1st discharge capacity (mAh) | 2nd charge capacity (mAh) | 2nd discharge capacity (mAh) |
|---|---|---|---|---|---|---|---|---|
| 1 | Ti | $Li_{0.36}MnO_2$ | 5M LiCl adjusted to pH of 12 with LiOH | 1.2 | 6.5 | 5.3 | 5.9 | 5.4 |
| 2 | 1225 | $Li_{0.36}MnO_2$ | 8M Li (acetate) | 1.3 | 7.0 | 4.4 | 9.8* | 7.4* |
| 3 | 1225 | $Li_{0.36}MnO_2$ | 1.5M $Li_2SO_4$ | 1.3 | 13.2 | 6.0 | 8.1 | 5.4 |
| 4 | 1225 | $Li_{0.36}MnO_2$ | 5.7M $LiNO_3$ pH = 7 | 1.3 | 13.5 | 8.1 | 10.0 | 7.8 |
| 5 | 1225 | $LiO_{0.36}MnO_2$ | 10M LiCl adjusted to pH of 12 with LiOH | 1.3 | 4.4 | 3.0 | 6.6* | 4.1* |
| 6 | 1225 | $LiMn_2O_4$ | 10M LiCl adjusted to pH of 12 with LiOH | 1.4 | 3.5 | 3.2 | 0.9 | 0.8 |
| 7 | Ti | $LiMn_2O_4$ | 10M LiCl adjusted to pH of 12 with LiOH | 1.4 | 6.7 | 5.3 | 6.4 | 5.8 |
| 8 | Ti | $VO_2$ (B) | 5.7M $LiNO_3$ adjusted to pH of 12 with LiOH | 1.7 | 11.0 | 9.3 | 10.0 | 9.0 |

TABLE 1-continued

Summary of matrix tests of Example 3.

| Battery No. | Construction | Anode | Electrolyte | Initial Upper Cutoff (V) | 1st charge capacity (mAh) | 1st discharge capacity (mAh) | 2nd charge capacity (mAh) | 2nd discharge capacity (mAh) |
|---|---|---|---|---|---|---|---|---|
| 9 | 1225 | $VO_2$ (B) | 5.7M $LiNO_3$ adjusted to pH of 12 with LiOH | 1.7 | 11.7 | 9.5 | 10.4 | 9.6 |
| 10 | 1225 | $LiMn_2O_4$ | 5.0M $LiNO_3$ | 1.5 | 7.2 | 6.7 | 3.3 | 3.2 |
| 11 | 1225 | $LiMn_2O_4$ | 5.0M $LiNO_3$ | 1.4 | 5.1 | 4.6 | 3.1 | 2.9 |

*denotes upper voltage cutoff was raised after 1st cycle

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rechargeable battery comprising:
   (a) a cathode comprising a first insertion compound with inserted species A, the amount of inserted A increasing on discharge and decreasing on recharge of the battery, wherein A is a member of the group consisting of the alkali metals and alkaline earth metals;
   (b) an anode comprising a second insertion compound with inserted species A, the amount of inserted A decreasing on discharge and increasing on recharge of the battery; and
   (c) an electrolyte comprising a salt of species A dissolved in an aqueous solvent mixture, in a concentration such that both first and second insertion compounds are kinetically stable therein over respctive ranges of inserted A.

2. A rechargeable battery as claimed in claim 1 wherein the pH of the electrolyte is greater than 7.

3. A rechargeable battery as claimed in claim 1 wherein A is lithium.

4. A rechargeable battery as claimed in claim 3 wherein the first insertion compound is a lithium transition metal oxide.

5. A rechargeable battery as claimed in claim 4 wherein the first insertion compound is a lithium manganese oxide.

6. A rechargeable battery as claimed in claim 5 wherein the lithium manganese oxide is spinel $Li_xMn_2O_4$, wherein x is a number in the range from 0 to about 2.

7. A rechargeable battery as claimed in claim 3 wherein the second insertion compound is a lithium transition metal oxide.

8. A rechargeable battery as claimed in claim 7 wherein the second insertion compound is a lithium manganese oxide.

9. A rechargeable battery as claimed in claim 8 wherein the lithium manganese oxide is spinel $Li_xMn_2O_4$, wherein x is a number in the range from 0 to about 2.

10. A rechargeable battery as claimed in claim 8 wherein the lithium manganese oxide is $Li_yMnO_2$ with a $\gamma$-$MnO_2$ structure, wherein y is a number in the range from 0 to about 1.

11. A rechargeable battery as claimed in claim 7 wherein the second insertion compound is a lithium vanadium oxide.

12. A rechargeable battery as claimed in claim 11 wherein the lithium vanadium oxide is $Li_zVO_2(B)_1$ wherein z is a number in the range from 0 to about 0.5.

13. A rechargeable battery as claimed in claim 1 wherein A is lithium and the salt of A is LiOH, LiCl, $LiNO_3$, $Li_2SO_4$, or Li(acetate).

14. A rechargeable battery as claimed in claim 2 wherein the electrolyte further comprises an additional hydroxide salt, the concentration of said additional hydroxide salt being less than the concentration of the salt of A.

15. A rechargeable battery as claimed in claim 14 wherein A is lithium, the salt of A is LiCl, $LiNO_3$, $Li_2SO_4$, or Li(acetate) and the additional hydroxide salt is LiOH.

16. A rechargeable aqueous electrolyte lithium ion battery comprising:
   (a) a battery case;
   (b) at least one set of electrochemical cell electrodes placed in said case, said set of electrodes including:
      (i) an $LiMn_2O_4$ cathode, wherein the Li is inserted in the $Mn_2O_4$, the amount of inserted Li increasing on discharge and decreasing on recharge of the battery; and
      (ii) an anode selected from the group consisting of $Li_{0.36}MnO_2$ with $\gamma MnO_2$ structure, $LiMn_2O_4$ and $Li_zVO_2(B)$, wherein z is a number in the range from 0 to about 0.5, the amount of inserted Li decreasing on discharge and increasing on recharge of the battery;
   (c) a wettable microporous polypropylene film separator material disposed between said cathode and said anode; and
   (d) an aqueous electrolyte disposed within said case and surrounding and wetting said cathode, said anode and said separator, said aqueous electrolyte comprising a lithium salt selected from the group consisting of LiOH, LiCl, $LiNO_3$, $Li_2SO_4$ and Li(acetate).

* * * * *

UNITED STATES PATENT AND TRADEMARK OFFICE
CERTIFICATE OF CORRECTION

PATENT NO. : 6,403,253 B1  Page 1 of 1
DATED : June 11, 2002
INVENTOR(S) : David Wainwright, Li Wu and Jeffrey Dahn It is certified that error appears in the above-identified patent and that said Letters Patent is hereby corrected as shown below:

Column 3,
Line 63, after "exist" insert -- , --.

Column 4,
Line 19, "delete "(".

Column 7,
Line 11, delete "which can include".
Line 12, delete "woven or matted polymer fiber sheet materials".

Column 8,
Line 52, delete "-".

Column 10,
Line 40, "OH-" should read -- OH⁻ --.

Column 11,
Line 17, delete "incorporating a wetting".
Line 18, delete "agent".

Signed and Sealed this

Eighth Day of October, 2002

Attest:

Attesting Officer

JAMES E. ROGAN
Director of the United States Patent and Trademark Office